United States Patent [19]
Kemp

[11] 4,081,659
[45] Mar. 28, 1978

[54] COFFEEMAKER WITH ELECTRICAL CORD STRAIN RELIEF

[75] Inventor: Charles L. Kemp, Asheboro, N.C.

[73] Assignee: General Electric Company, Bridgeport, Conn.

[21] Appl. No.: 742,531

[22] Filed: Nov. 12, 1976

[51] Int. Cl.² .......................... H05B 1/00; H01R 13/58
[52] U.S. Cl. .................................. 219/296; 174/65 R; 174/135; 219/541; 339/103 R; 339/105; 339/106; 339/107
[58] Field of Search ............. 174/65 R, 135; 219/296, 219/541; 339/103 R, 105, 106, 107

[56] References Cited
U.S. PATENT DOCUMENTS

| | | | |
|---|---|---|---|
| 2,090,609 | 8/1937 | Lemmon | 339/103 R |
| 2,544,343 | 3/1951 | Miller | 339/105 |
| 2,635,169 | 4/1953 | Miller | 106/166 |
| 3,493,723 | 2/1970 | Popeil | 219/288 |
| 3,789,344 | 1/1974 | Brorein | 339/59 M |
| 3,793,933 | 2/1974 | Weber | 99/283 |
| 3,909,101 | 9/1975 | Bruels | 339/107 |
| 3,918,355 | 11/1975 | Weber | 99/283 |
| 3,993,859 | 11/1976 | McNeel | 339/106 |
| 4,029,896 | 6/1977 | Skinner | 339/105 |

Primary Examiner—J. V. Truhe
Assistant Examiner—J. H. Bouchard
Attorney, Agent, or Firm—Leonard J. Platt; George R. Powers; John F. Cullen

[57] ABSTRACT

An electric coffeemaker with a plastic housing and a bottom cover wherein a partition is formed with the housing for enclosing an electrical cord strain relief knot, and two fingers are integrally formed with the bottom cover for uniquely cooperating with a side wall of the housing and the strain relief knot. In the event of any strain on the cord tending to pull it out of the housing, the knot will abut the two fingers to distribute the force between both the housing and the two fingers of the bottom cover.

7 Claims, 6 Drawing Figures

4,081,659

1

COFFEEMAKER WITH ELECTRICAL CORD STRAIN RELIEF

BACKGROUND OF THE INVENTION

This invention relates to appliances such as coffeemakers, and more particularly, to a unique electrical cord strain relief construction for such an applicance.

In the manufacture of electric drip coffeemakers it is conventional to provide a relatively thin plastic housing for enclosing an electric water heater and other electrical components of the coffeemaker. Such coffeemaker housings usually include a generally vertical side wall and it is common practice to provide a notch or a hole in the side wall for receiving an electrical cord. Perhaps the most common strain relief construction consists of a two piece insulator that securely grips the cord between the insulator pieces so that the electrical cord cannot be pushed in or pulled out of the insulator to damage electrical terminal connections within the housing.

In a prior U.S. Pat. No. 3,793,933 to Weber dated Feb. 26, 1974 there is disclosed an electric drip coffeemaker having a plastic side wall and an insulator 212 for electrical leads 413 and 412. As illustrated in FIG. 2 of the patent the insulator is connected to the plastic side wall of the housing by means of a peripheral annular groove that is provided on the insulator.

This invention is concerned with such electric drip coffeemakers and electrical cords, and more particularly, to a coffeemaker which is constructed to provide a rugged and reliable electrical cord strain relief which may be readily manufactured at relatively low cost.

Accordingly, it is a primary object of my invention to provide an improved coffeemaker housing bottom cover and electrical cord which are constructed so that in the event of any strain on the cord tending to pull it out of the housing or push it in the housing, the housing and the cord uniquely cooperate to hold the cord confined within the housing and the cord will be prevented from touching high temperature parts such as the electric water heater.

It is another object of my invention to provide an improved drip coffeemaker housing and electrical cord strain relief wherein the housing and its bottom cover may be formed from relatively thin inexpensive plastic and the strain relief is constructed of relatively few parts which may be readily manufactured and connected to each other at relatively low cost.

SUMMARY OF THE INVENTION

In accordance with one of the aspects of this invention an electrical appliance such as a drip coffeemaker has a housing including an upper wall, a downwardly extending side wall, and an enlarged bottom opening. An electrical cord extends into the housing and a bottom cover is provided for closing the enlarged bottom opening in the housing. The plastic housing is formed to include a downwardly extending rib having a longitudinal wall and a transverse wall for providing a strain relief knot partition. While the parts of the rib are relatively thin they are rugged and substantial for their purpose since they are integrally formed with the plastic side wall and the upper plastic wall of the housing. A notch is formed in the side wall of the housing adjacent to the transverse wall of the rib and opposite to the longitudinal wall of the rib. The notch is just large enough to receive a cross section of the electrical cord. A single overhand knot is tied in the electrical cord and

2 the knot is tightened to provide two bights which will naturally be arranged at an angle to each other when the knot is tightened. The partition formed by the longitudinal and transverse walls of the rib is just large enough to receive the knot with one bight extending generally parallel to the side wall of the housing and the other bight extending inwardly toward the longitudinal wall. The bottom cover is also formed of low cost plastic and it includes two integrally formed upwardly extending fingers that are arranged to straddle the notch in the side wall of the housing and the electrical cord.

With this construction, in the event of any strain on the cord tending to pull it out of the housing the knot that is tied in the cord and particularly the generally parallel bight will abut the two fingers that are formed in the bottom cover to distribute the force between both the housing and the bottom cover.

Moreover, with this unique construction the strain relief is provided without the addition of any separate parts. The rib including its longitudinal and transverse walls is very economically formed with the housing at the same time that the housing is being molded. Likewise, the fingers on the bottom cover are economically provided since they may be integrally molded at the same time that the bottom cover is being molded.

In addition, with this construction both the plastic housing and the bottom cover may be formed of very thin inexpensive plastic since the forces tending to pull the cord out of the housing or push the cord in the housing may be distributed over a very wide area. The relative distribution of the forces on the fingers of the bottom cover or the side wall of the housing may be adjusted by simply controlling the thickness of the fingers and the area of the fingers that are placed in contact with the side wall of the housing.

With this construction, there is no need to use separate strain relief or insulator members such as member 212 shown in U.S. Pat. No. 3,793,933, and there is no need to form a relatively thick housing side wall in the vicinity of a separate strain relief insulator.

Thus, an exceedingly simple, rugged and reliable strain relief, which may be readily manufactured at relatively low cost, has been achieved.

BRIEF DESCRIPTION OF THE DRAWING

Other objects and attendant advantages of the invention will be apparent from the following description taken in connection with the accompanying drawing in which.

DESCRIPTION OF THE PREFERRED EMBODIMENT

Figure 1:
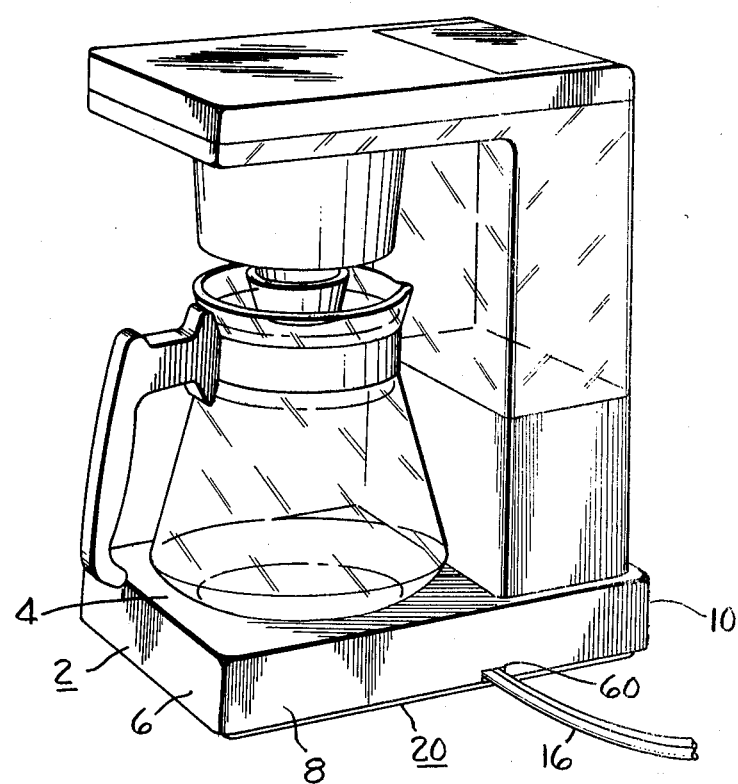
FIG. 1 is a rear perspective view of an electric drip coffeemaker with an improved electrical cord strain relief constructed in accordance with my invention.
Figure 5:
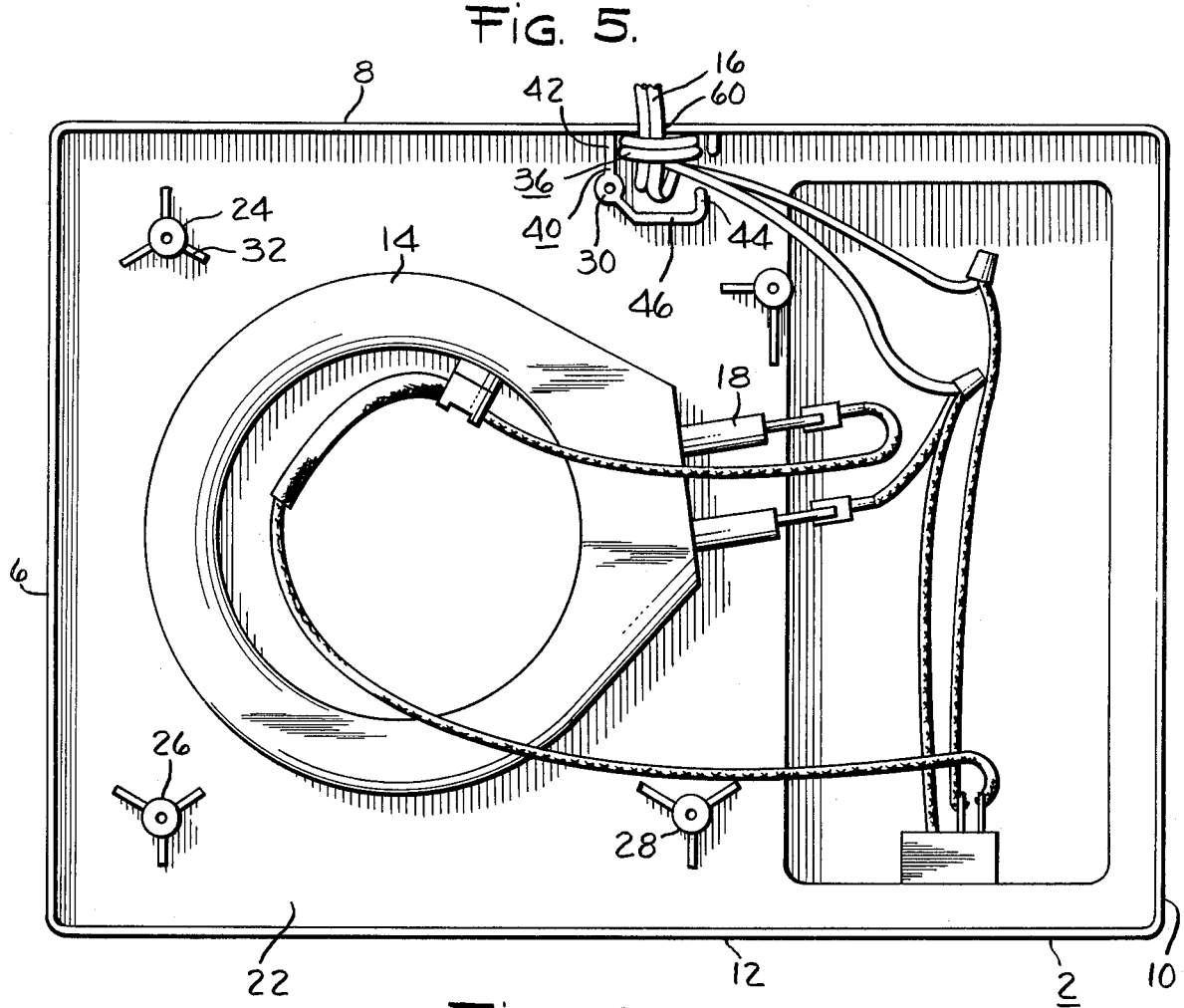
FIG. 5 is a bottom plan view of the housing illustrated in FIG. 1.
Figure 6:
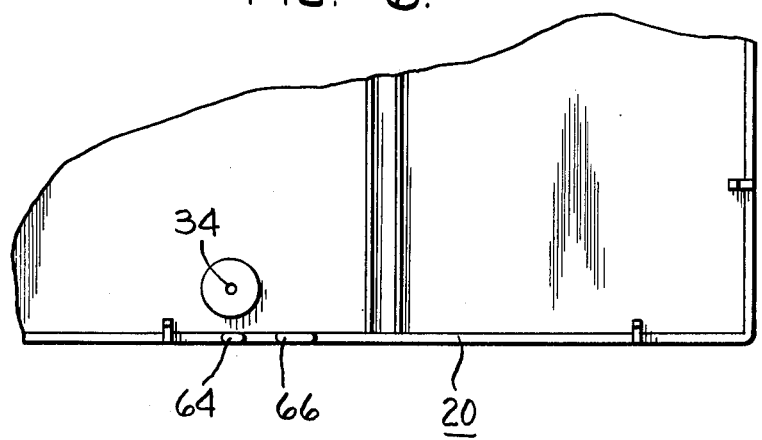
FIG. 6 is a fragmentary top plan view of the bottom cover shown in FIG. 1.

Referring now to the drawing and first particularly to FIGS. 1, 5 and 6 there is shown an electric drip coffeemaker which includes my unique electrical cord strain relief construction. The coffeemaker includes a lower housing 2 having a generally horizontal upper wall 4 and downwardly extending generally vertical side walls 6, 8, 10 and 12.

As shown more particularly in FIG. 5 an electric water heater 14 is positioned within the housing and an electrical cord 16 is provided for energizing an electric heating element 18.

The electrical water heater construction for heating brewing water and for keeping the coffee warm after it has been brewed does not form a part of this invention and is described and illustrated in greater detail in a copending application of Richard N. Brown, Ser. No. 702,577, assigned to the same assignee as the present invention.

With particular reference to FIGS. 1, 5 and 6 it can be appreciated that a bottom cover 20 is provided for closing the enlarged opening 22 that is formed by the downwardly extending side walls 6, 8, 10 and 12. Both the housing 2 and the cover 20 are preferably formed from low cost plastic material, and in order to connect the bottom cover 20 to the housing 2 a plurality of downwardly extending screw receiving bosses 24, 26, 28 and 30 are integrally formed with the housing 2. Suitable supporting fins 32 may also be integrally formed with the housing and the bosses for securely holding the bosses in position on the housing. A plurality of screw receiving apertures 34 may be integrally formed with the bottom cover 20 for mating with the screw receiving bosses 24, 26, 28 and screws 70 may be provided for securely connecting the bottom cover to the housing.

Electrical Cord Strain Relief

In accordance with my invention the lower housing 2 and the bottom cover 20 are uniquely constructed for cooperating with a strain relief knot 36 that may be tied in the electrical cord. As shown in FIG. 5 a principal component of the strain releif arrangement includes a partition rib 40 that is integrally molded with the housing 2. The rib includes two transverse walls 42 and 44 and a generally longitudinal wall 46. As shown, the transverse walls are arranged generally perpendicular to the side wall 8 while the longitudinal wall 46 extends generally parallel to the side wall 8. In accordance with my invention the rib walls 42 and 46 are integrally formed with the screw receiving boss 30, and thus, the walls 42 and 46 serve the dual function of supporting the screw receiving boss and forming a partition for the strain relief knot 36.

Figure 2:
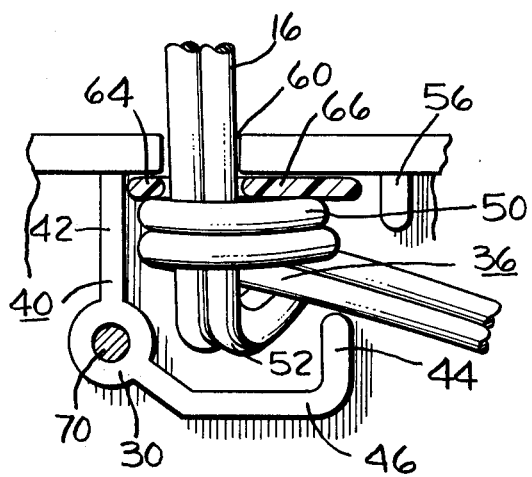
FIG. 2 is an enlarged fragmentary bottom plan view of a portion of my improved housing and electrical cord.

As shown more particularly in FIG. 2, the partition and other components of my invention are shaped to rather closely confine the strain relief knot 36. The knot is preferably a single overhand knot that is tightened to provide two bights 50 and 52. As shown in FIG. 2, when a strain is exerted on the cord 16 tending to pull it out of the housing the bight 50 will be arranged generally parallel to the wall 8 while the bight 52 will extend toward the longitudinal wall 46. The outer dimensions of the knot 36 in the vicinity of the side wall 8 are somewhat larger than the dimensions some distance from the side wall and accordingly, the enclosure for the knot 36 is completed by an ear 56 that is arranged generally parallel to transverse walls 42 and 44 but is spaced further from wall 42 than wall 44. As shown in FIG. 5, the housing 2 is also provided with a notch 60 that is integrally formed in the side wall 8 opposite to the generally longitudinal wall 46. The notch 60 is of a size only slightly larger than the cross section of the electrical cord 16 in order to hold the cord and the knot 36 in position within the housing.

Figure 3:
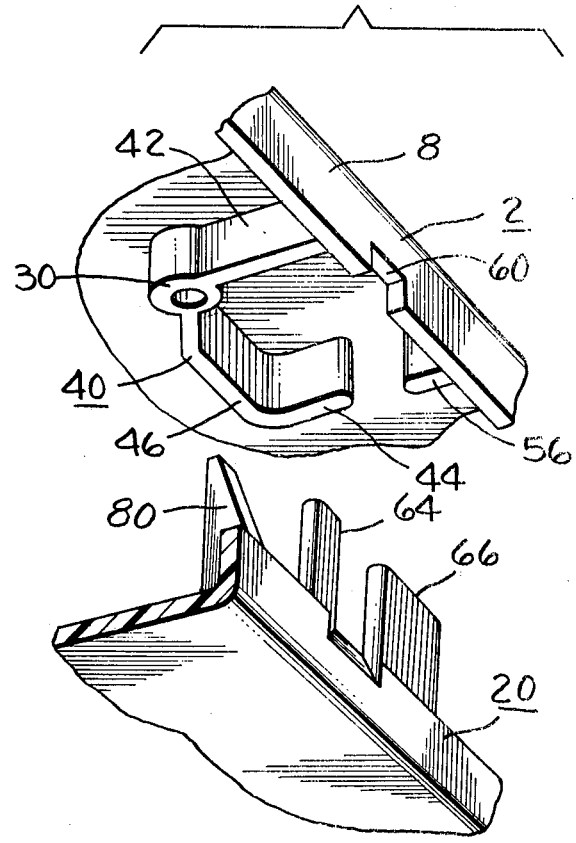
FIG. 3 is an exploded fragmentary perspective view of my improved housing and bottom cover.
Figure 4:
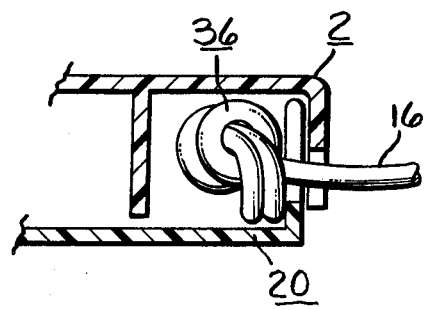
FIG. 4 is a fragmentary cross-sectional view of the housing bottom cover and electrical cord.

One of the objects of my invention is to provide a strain relief construction that may be effectively used in housings that have relatively thin side walls, and thus, the lower cover 20 is uniquely constructed for absorbing some of the strain that may be placed on the cord 16. As shown in FIGS. 2 and 3, the bottom cover 20 includes two upwardly extending fingers 64 and 66 which are arranged to straddle the notch 60 and the electrical cord 16 that extends therethrough so that in the event of any strain on the cord tending to pull it out of the housing, the knot 36 that is tied in the cord will abut the two fingers 64 and 66 to distribute the force between the fingers 64 and 66 and the portion of the side wall 8 of the housing adjacent to the notch 60. It can be appreciated that the relative width and thickness of the fingers 64 and 66 with respect to the thickness of the housing side wall 8 is such that when strain force is applied to both the fingers and the housing both the housing and the fingers absorb some of the force without being broken.

As shown, finger 66 is somewhat wider than finger 64 inorder to substantially fill up the space from the cord 16 to ear 56 in order to closely confine the knot and the fingers within the enclosure. It can also be appreciated that with this construction the total surface area of the fingers 64 and 66 that is in contact with the inside wall of the housing is substantially larger than the total surface area of the bight portion 50 of the knot that is arranged generally parallel to the fingers. Thus, the fingers 64 and 66 also serve to distribute the outward force on the housing over a substantial area of the housing. Accordingly, in accordance with my invention with a thinner housing side wall 8, the width of the fingers 64 and 66 may be made larger in order to distribute the force over a greater area than that illustrated.

In order to connect the parts to each other it can be appreciated that a knot 36 is tied in the electrical cord 16 and the knot is positioned within the partition 42, 46 with the bight 50 arranged generally parallel to side wall 8 of the housing. One end of the cord extends through the notch 60 and the other end of the cord is arranged to pass between the ear 56 and the transverse wall 44. After suitable electrical connections have been made to the inner end of the cord, the housing 20 guided by lugs 80 may be positioned over the bottom opening with the fingers 64, 66 straddling the electrical cord. Then screws 70 are simply inserted within apertures 34 in the bottom cover and secured to the screw receiving studs 24, 26, 28 and 30. It can be appreciated that the screw 70 that extends into boss 30 provides a substantial force to hold the cover 20 into contact with the lower portions of the walls 42 and 46 to prevent the cord 16 from sliding between any space between the walls 42 and 46 and the bottom cover 20.

From the foregoing discussion it can be appreciated that with my unique construction a rugged and reliable strain relief may be provided adjacent to a relatively thin housing wall without the addition of any separate components. The rib partition 40 including its longitudinal and transverse walls is very economically molded integrally with the housing side wall 8 at the same time that the housing is being molded. In like manner, the fingers 64 and 66 on the bottom cover 22 are integrally molded with the bottom cover 20 at the same time that the bottom cover is being molded. Thus, an exceedingly simple, reliable and rugged strain relief is economically achieved.

What I claim is:

1. In an electrical appliance having a housing including an upper wall, a downwardly extending side wall and an enlarged bottom opening, an electrical cord extending into the housing, and a bottom cover for closing the enlarged bottom opening in the housing the improvement comprising:
   a. a downwardly extending rib integrally formed with the upper wall of the housing and the side wall of the housing, said rib having a longitudinal wall and a transverse wall;
   b. a notch formed in the side wall of the housing adjacent to said transverse wall and opposite to said longitudinal wall, said notch being of a size only slightly larger than the cross section of said electrical cord;
   c. an overhand knot tied in said electrical cord and tightened to provide two bights arranged at an angle to each other;
   d. the longitudinal and transverse walls of said rib being spaced from said side wall to provide a partition that is just large enough to receive said knot with one bight extending generally parallel to said side wall and the other bight extending toward said longitudinal wall; and
   e. said bottom cover including two upwardly extending fingers integrally formed therewith, said fingers being arranged to straddle the notch in the side wall of said housing and the electrical cord that extends therethrough so that in the event of any strain on the cord tending to pull it out of the housing the knot that is tied in the cord will abut the two fingers that are formed in the bottom cover to distribute the force between both the housing and the bottom cover and to confine the cord within the housing.

2. An electric appliance as defined in claim 1 wherein the surface area of the two fingers that are placed in contact with the side wall of the housing is greater than the surface area of the bight of the electrical cord that is placed in contact with the fingers so that in the event of any strain on the cord the fingers will be forced against a substantial area of the housing in order to distribute the outward force on the housing over a substantial housing area.

3. An electric appliance as defined in claim 1 wherein a plurality of screw receiving bosses are integrally formed with the housing for connecting the bottom cover to said housing, each of said screw receiving bosses extending downwardly from an upper wall of the housing and one of said screw receiving bosses being integrally formed with and positioned between the longitudinal wall and the transverse wall of said rib in order to provide added strength to the rib.

4. An electric appliance as defined in claim 3 wherein a plurality of screws extend through the bottom cover for urging the bottom cover into intimate contact with the longitudinal wall and the transverse wall of the rib in order to prevent any portion of the cord from extending into any space between the bottom cover the longitudinal and transverse walls of the rib.

5. An electric appliance as defined in claim 1 wherein an inwardly extending ear is integrally formed with the upper wall and the side wall of the housing spaced from the transverse wall of said rib and extending toward the longitudinal wall of the rib, said ear being about the same size as a cross section of said electrical cord to provide a partition wall for the bight of said knot that extends generally parallel to the side wall of the housing.

6. In an electrical coffeemaker wherein an electric water heater is positioned in a hollow plastic housing having a generally horizontal wall, downwardly extending vertical side wall means, and an enlarged bottom opening, an electrical cord is provided for connection with the electric water heater, and a bottom cover is provided for closing the enlarged bottom opening in the housing the improvement comprising:
   a. a generally vertical downwardly extending rib integrally formed with the horizontal wall of the housing and the generally vertical side wall means of the housing, said rib having a longitudinal wall and two transverse walls, one of said transverse walls being connected to said side wall and the other transverse wall being spaced from said side wall to permit passage of said electrical cord to said electric water heater;
   b. a notch formed in the side wall means of the housing adjacent to said transverse wall and opposite to said longitudinal wall, said notch being of a size only slightly larger than the cross section of said electrical cord;
   c. a single overhand knot tied in said electrical cord and tightened to provide two bights arranged generally perpendicular to each other;
   d. the longitudinal and transverse walls of said rib being spaced from said side wall to provide a partition that is just large enough to receive said knot with one bight extending generally parallel to said side wall means and the other bight extending toward said longitudinal wall; and
   e. said bottom cover including two upwardly extending fingers integrally formed therewith, said fingers being arranged to straddle the notch in the side wall means of said housing and the electrical cord that extends therethrough so that in the event of any strain on the cord tending to pull it out of the housing the knot will abut the two fingers that are formed in the bottom cover and the fingers will be forced against a substantial area of the side wall of the housing in order to distribute the outward force on the housing over a substantial area to confine the cord within the housing and prevent any breakage of the housing, the space between said bottom cover and said partition being so small that any inward forces on the cord cannot substantially loosen the knot and cannot push the electrical cord into damaging contact with said electric water heater.

7. In an electric appliance having a housing including an upper wall a downwardly extending side wall and and enlarged bottom opening, an electrical cord extending into the housing, and a bottom cover for closing the bottom opening in the housing the improvement comprising:
   a. a downwardly extending rib integrally formed with the housing, said rib having a longitudinal wall and a transverse wall;
   b. a notch formed in the side wall of the housing adjacent to said transverse wall and opposite to said longitudinal wall, said notch being of a size only slightly larger than the cross section of said electrical cord;

c. a single overhand knot tied in said electrical cord and tightened to provide two bights arranged generally perpendicular to each other;

d. the longitudinal and transverse walls of said rib being spaced from said side wall to provide a partition that is just large enough to receive said knot with one bight extending generally parallel to said side wall and the other bight extending toward said longitudinal wall; and e. said bottom cover including two upwardly extending fingers integrally formed therewith said fingers being arranged to straddle the notch in the side wall of the housing and the electrical cord that extends therethrough so that in the event of any strain on the cord tending to pull it out of the housing the generally parallel bight of the electrical cord will abut the two fingers that are formed in the bottom cover of the housing and the fingers will be forced against a substantial area of the side wall of the housing in order to distribute the outward force between both the housing and the bottom cover to confine the cord within the housing and prevent any breakage of the housing.

* * * * *